United States Patent [19]

Glembin et al.

[11] Patent Number: 4,490,343

[45] Date of Patent: Dec. 25, 1984

[54] METHOD FOR THE SEPARATION OF CHLOROSILANES FROM A GASEOUS MIXTURE CONTAINING HYDROGEN CHLORIDE AND HYDROGEN

[75] Inventors: Dirk Glembin, St. Augustin; Fritz-Robert Kappler, Troisdorf, both of Fed. Rep. of Germany; Luigi Curatolo, Merano; Vittorio Trapani, Sinigo, both of Italy

[73] Assignee: Dynamit Nobel AG, Cologne, Fed. Rep. of Germany

[21] Appl. No.: 561,163

[22] Filed: Dec. 14, 1983

[30] Foreign Application Priority Data

Dec. 24, 1982 [DE] Fed. Rep. of Germany ....... 3247997

[51] Int. Cl.³ .............................................. C01B 33/12
[52] U.S. Cl. .................... 423/336; 423/342; 423/240; 423/481; 423/644
[58] Field of Search ............... 423/346, 347, 349, 336, 423/481, 240, 644

[56] References Cited

U.S. PATENT DOCUMENTS 4,252,780 2/1981 Köppl ................... 423/335

FOREIGN PATENT DOCUMENTS 672163 5/1952 United Kingdom ............... 423/336
1139477 1/1969 United Kingdom ............... 423/342
262843 10/1968 U.S.S.R. ......................... 423/240 R Primary Examiner—L. Dewayne Rutledge
Assistant Examiner—Christopher W. Brody
Attorney, Agent, or Firm—Felfe & Lynch

[57] ABSTRACT

A method for separating chlorosilanes from a gaseous mixture which additionally contains hydrogen and hydrogen chloride by washing the gaseous mixture with saturated hydrochloric acid is disclosed. The resulting chlorosilane hydrolysis products can remain in the hydrochloric acid serving as washing liquid, without interfering with the purifying action. The suspended hydrolysis products are easily filtrable, and can be periodically separated from the hydrochloric acid. In a preferred embodiment, the hydrochloric acid is recirculated and injected into the gas stream being washed.

9 Claims, 1 Drawing Figure

FLOW DIAGRAM

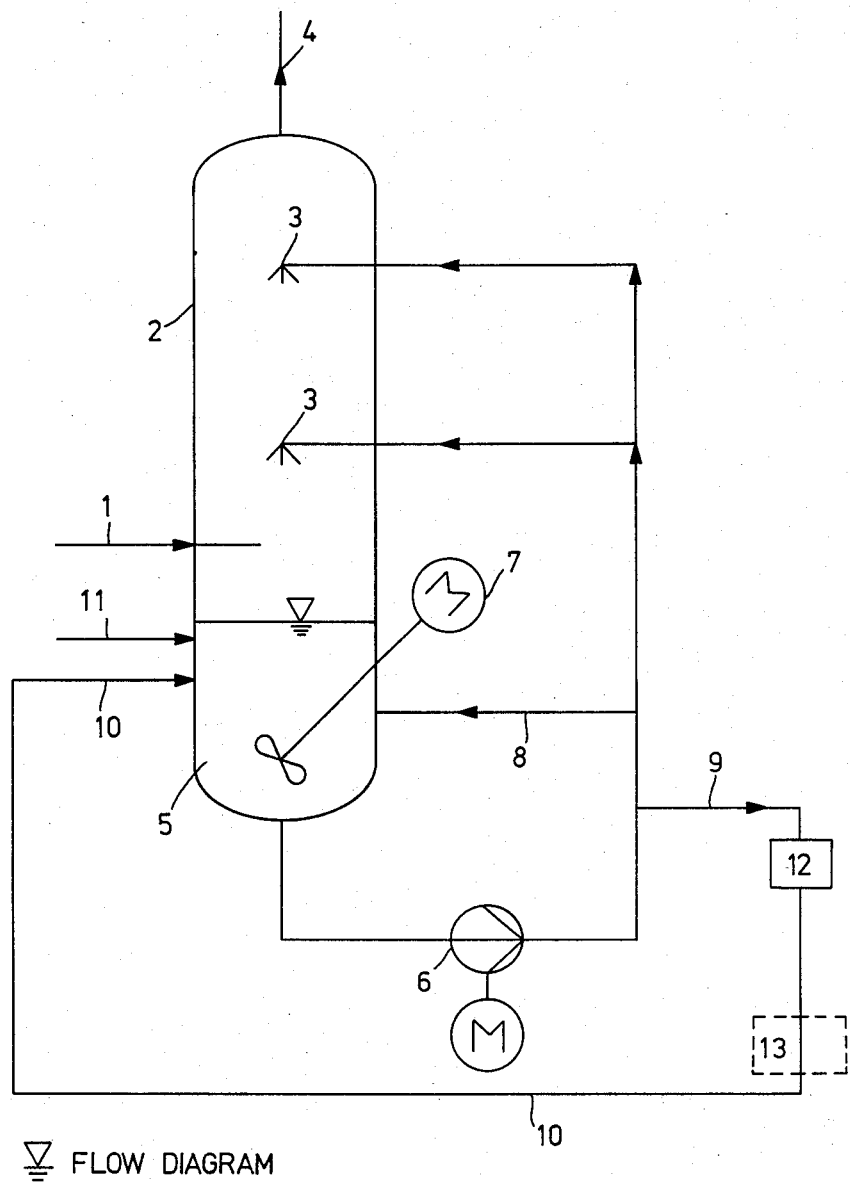
FLOW DIAGRAM

METHOD FOR THE SEPARATION OF CHLOROSILANES FROM A GASEOUS MIXTURE CONTAINING HYDROGEN CHLORIDE AND HYDROGEN

BACKGROUND OF THE INVENTION

The subject matter of the present invention is a method for the separation of chlorosilanes from a gaseous mixture of hydrogen chloride, hydrogen, and chlorosilanes. The separation if performed by means of a washing liquid, and a gaseous mixture of hydrogen chloride and hydrogen is obtained which is virtually entirely free of chlorosilanes. The gaseous mixture of hydrogen chloride and hydrogen can easily be separated into its two components.

Gaseous mixtures of chlorosilanes, hydrogen chloride and hydrogen are produced on a large technical scale as exhaust gases in the production of polycrystalline silicon. The object is to recover from this exhaust gas both the hydrogen chloride and the hydrogen, and to re-use the latter for the production of polycrystalline silicon. This hydrogen, however, must be free of impurities, so that the first and most important step in this chain of purifications is the separation of the chlorosilanes from the gaseous mixture.

It is already known from DE-PS No. 1,285,593 to use water for the treatment of exhaust gases from the production of polycrystalline silicon which contain largely the three compounds named above. The chlorosilanes react to form hydrolysis products and the hydrogen chloride is washed out of the gas mixture by the washing water. A disadvantage in this process is that a very dilute hydrochloric acid is produced from the hydrogen chloride. Furthermore, the hydrolysis products tend to encrust the apparatus. The time and effort required for the virtually complete separation of this hydrochloric acid from the suspended hydrolysis products is very high. Also, it is only at a great cost of time, effort and energy that the dilute hydrochloric acid can be concentrated. Generally, therefore, this is not the course that is chosen, and the dilute hydrochloric acid is destroyed by neutralization with caustic soda solution.

The problem therefore existed of removing chlorosilanes from a gaseous mixture of hydrogen, hydrogen chloride and chlorosilanes such that the hydrolysis products that form in the washing will be in an easily filtrable form, and that the hydrogen chloride will not also remain in the washing liquid but will be preserved in gaseous form in a mixture with the hydrogen.

SUMMARY OF THE INVENTION

For the solution of this problem a method has now been found for the separation of chlorosilanes from a gaseous mixture of hydrogen chloride, hydrogen and chlorosilanes, in which this gaseous mixture is washed with water with the formation of hydrolyzate. It is characterized by the fact that the washing is performed with saturated hydrochloric acid in which the products of the hydrolysis of the chlorosilanes, formed by the washing, remain suspended.

When this process of the invention is performed, a gaseous mixture is produced which is virtually entirely free of the chlorosilanes, and contains only the hydrogen chloride and hydrogen components. The gas also still carries small amounts of water vapor according to the partial pressure of the water. The hydrolysis products of the chlorosilanes do not tend to form incrustations and lumps and can easily be separated by means of known filtration methods.

The hydrogen chloride content in the hydrochloric acid used as washing liquid depends on the partial pressure of the hydrogen chloride at the selected working temperature. It is generally more than 25% by weight, and can amount to as much as 45% or more. Such saturated hydrochloric acid is also referred to as fuming hydrochloric acid. The hydrochloric acid is to be used as a highly saturated acid, so that it will be able to absorb only small additional amounts of hydrogen chloride during the washing. These amounts are not to exceed 5% by weight, if possible. They depend on the partial pressure of hydrogen chloride in the entire system. In accordance with the invention, therefore, a saturated hydrochloric acid is also to be understood as a hydrochloric acid of this kind which still can absorb the above-mentioned small amounts of hydrogen chloride, in which case the effect in accordance with the invention will still be produced.

The working temperature depends both on the ambient temperature and on the amount of the chlorosilane contained in the gaseous mixture. Preferably it is between 20° and 40° C.; it can, however, be either below or above these levels. Since the formation of the hydrolysis products in the washing is an exothermic reaction, it may be desirable, in the case of a relatively high chlorosilane content, to cool the hydrochloric acid before introducing it into the system.

The washing of the gaseous mixture of hydrogen chloride, hydrogen and chlorosilanes with the saturated hydrochloric acid can be performed in any desired, known manner which permits long and intensive contact of the gaseous mixture with the washing liquid. Injection through a nozzle, or sprinkling or spraying the washing liquid into the gaseous stream, has proven to be the preferred method. Also, the injection of the washing fluid can be performed either countercurrently or in the same direction as the flow of the gaseous mixture.

The chlorosilane hydrolysis products produced during the washing with the saturated hydrochloric acid minimally interfere with the washing. To the degree that these hydrolysis products are solids, the hydrochloric acid can contain them in suspension. Since, in the case of a continuous method of operation, these solid hydrolysis products increasingly concentrate, it is desirable to periodically remove these solids entirely or partially from the hydrochloric acid. This can be accomplished, for example, by simple filtration since these hydrolysis products occur in the form of easily filtrable solids.

In a continuous operation using the method of the invention, it is advantageous to recirculate the saturated hydrochloric acid by tapping a partial stream therefrom which passes through a filter and, if desired, an intermediate receiver. This partial stream is then returned to the washing system.

The gaseous mixture of hydrogen chloride and hydrogen obtained by the method of the invention still contains small amounts of water vapor; in the case of a continuous process these amounts must be replaced from time to time by adding water or aqueous hydrochloric acid to the system in the appropriate amount.

The separation of the gaseous mixture into the two components, hydrogen chloride and hydrogen, is performed by known methods; thus it is possible to absorb the hydrogen chloride in water and thus to obtain very pure hydrochloric acid from which gaseous hydrogen chloride can be obtained, if desired, by desorption. The hydrogen obtained after the absorption of the hydrogen chloride can be dried and purified and re-used for the precipitation of silicon.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The drawing is a flow diagram illustrating a preferred embodiment of the method of the invention.

DESCRIPTION OF PREFERRED EMBODIMENT

An exhaust gas charged with chlorosilanes and containing a mixture of hydrogen and hydrogen chloride is delivered through the line 1 to the gas washer 2. This gaseous mixture flows past one or more nozzles 3 in a countercurrent direction to the wash liquid and leaves the gas washer largely free of chlorosilanes through line 4 as a mixture of hydrogen chloride and hydrogen. The reverse is also possible, i.e., the exhaust gas enters through line 4 and the purified gaseous mixture leaves the gas washer through line 1.

The bottom 5 of the gas washer contains saturated hydrochloric acid, in which the chlorosilane hydrolysis products produced in the absorption are suspended. The suspension is circulated by means of recirculating pump 6. A stirrer 7, or a line 8 through which a portion of the liquid delivered by the pump flows, produces turbulence to prevent the hydrolysis products from settling in the bottom of the gas washer.

The suspension is introduced into the washer by means of the nozzles 3. The chlorosilanes are absorbed form the exhaust gas on the individual droplets of the sprayed suspension, where they react to form hydrogen chloride and hydrolysis products. The droplets are collected in the bottom of the gas washer.

A portion of the suspension is tapped off through line 9 and delivered for filtration at 12. The filtrate is returned to the gas washer through line 10, which passes if desired through an intermediate tank 13. Water is delivered into the gas washer 2 through the line 11 to make up for the losses resulting from the retention of moisture by the filtered solids, as well as from evaporative losses through line 4 in the exhaust gas.

EXAMPLE 1

A mixture of hydrogen chloride and hydrogen having a chlorosilane content amounting to more than 1000 mg of silicon per cubic meter is introduced into a gas washer represented in the drawing. The gas washer is operated countercurrently at gas velocities between 0.05 and 0.15 m/s and gas retention or residence times of 10 to 25 seconds. The two nozzles 3 are fed together with suspension at the rate of 0.5 to 1.7 cu.m. per hour, and the differential pressure in the nozzles amounts to from 2 to 6 bar. The maximum solid concentration in the suspension is 50 grams per liter, expressed as silicon.

In the mixture of hydrogen chloride and hydrogen leaving the gas washer at 4, concentrations of no less than 40 mg of silicon per cubic meter are found. In a secondary gas washer operated in a similar manner, it was possible to reduce the exhaust gas concentration to 5 mg of silicon per cubic meter.

EXAMPLE 2

Equal results were obtained with a jet washer instead of the nozzles. In this case the input concentration was between 500 and 1000 mg of silicon per cubic meter, the rate of delivery of the suspension was between 1.5 and 2.0 cu.m. per hour, and the gas velocities between 5 and 10 m/s.

It will be understood that the specification and examples are illustrative but not limitative of the present invention and that other embodiments within the spirit and scope of the invention will suggest themselves to those skilled in the art.

We claim:

1. A method for the separation of chlorosilanes from a gaseous mixture of hydrogen chloride, hydrogen and chlorosilanes comprising washing the gaseous mixture with a washing liquid consisting essentially of saturated hydrochloric acid.

2. The method of claim 1, wherein the saturated hydrochloric acid contacts the gaseous stream in finely divided form.

3. The method of claim 1, wherein the hydrochloric acid is recirculated by passing a partial stream through a filter and, if desired, an intermediate tank.

4. The method of claim 3, wherein water or hydrochloric acid is added to the circulation system in an amount that is withdrawn from the system during the washing.

5. The method of claim 1, wherein the gaseous mixture and washing liquid are introduced into a washing device in countercurrent flow.

6. The method of claim 1, wherein the gaseous mixture and washing liquid are introduced into a washing device in co-current flow.

7. The method of claim 1, wherein the washing liquid contains at least 25% by weight hydrogen chloride.

8. The method of claim 1, wherein the washing liquid is cooled before it is contacted with the gaseous mixture.

9. The method of claim 1, wherein chlorosilane hydrolysis products are produced by the washing and are suspended therein.

* * * * *